United States Patent
Catalli et al.

(10) Patent No.: US 12,052,648 B2
(45) Date of Patent: Jul. 30, 2024

(54) LOCATION-BASED BASE STATION BANNING FOR MOBILE SYSTEMS

(71) Applicant: Cisco Technology, Inc., San Jose, CA (US)

(72) Inventors: Gaetano Catalli, Florence (IT); Alessandro Erta, Licciana Nardi (IT); Luca Bisti, Grosseto (IT)

(73) Assignee: Cisco Technology, Inc., San Jose, CA (US)

( * ) Notice: Subject to any disclaimer, the term of this patent is extended or adjusted under 35 U.S.C. 154(b) by 427 days.

(21) Appl. No.: 17/220,220

(22) Filed: Apr. 1, 2021

(65) Prior Publication Data

US 2022/0322206 A1   Oct. 6, 2022

(51) Int. Cl.
*H04W 48/04* (2009.01)
*H04W 64/00* (2009.01)

(52) U.S. Cl.
CPC ......... *H04W 48/04* (2013.01); *H04W 64/003* (2013.01)

(58) Field of Classification Search
CPC ... H04W 48/04; H04W 64/003; H04W 24/02; H04W 24/04; H04W 24/08
See application file for complete search history.

(56) References Cited

U.S. PATENT DOCUMENTS

| | | | |
|---|---|---|---|
| 6,597,906 B1 * | 7/2003 | Van Leeuwen | H04W 64/006 455/436 |
| 7,738,884 B2 | 6/2010 | Cheung et al. | |
| 8,150,417 B2 | 4/2012 | Reed et al. | |
| 9,467,877 B2 | 10/2016 | Hanson et al. | |
| 9,553,772 B2 | 1/2017 | Dasgupta et al. | |
| 10,764,858 B2 | 9/2020 | Srinivasan et al. | |
| 2008/0268766 A1 * | 10/2008 | Narkmon | H04W 48/02 455/1 |
| 2010/0323715 A1 * | 12/2010 | Winters | G01S 5/0294 340/988 |
| 2014/0162652 A1 * | 6/2014 | Kang | H04W 52/285 455/436 |
| 2015/0350978 A1 * | 12/2015 | Jang | H04W 4/40 455/444 |

(Continued)

FOREIGN PATENT DOCUMENTS

| | | |
|---|---|---|
| EP | 3799471 | 3/2021 |
| EP | 3836621 | 6/2021 |

OTHER PUBLICATIONS

"Wi-Fi Positioning System", online: https://en/wikipedia.org/wiki/wi-fi_positioning_system, Mar. 25, 2021, 5 pages, The Wikimedia Foundation.

*Primary Examiner* — Charles N Appiah
*Assistant Examiner* — Frank E Donado
(74) *Attorney, Agent, or Firm* — BEHMKE INNOVATION GROUP LLC; James M. Behmke; Keith O. Mitchell (57) ABSTRACT

In one embodiment, a device obtains location data indicative of a location of a mobile system relative to a base station of a wireless network. The device predicts, based on the location data, a drop in received signal strength indicator as the mobile system approaches the base station. The device determines, based on the drop in received signal strength indicator or throughput that will occur as the mobile system approaches the base station. The device prevents the mobile system from communicating with the base station during the ban.

20 Claims, 9 Drawing Sheets

(56) References Cited

U.S. PATENT DOCUMENTS

| | | | |
|---|---|---|---|
| 2017/0006517 A1* | 1/2017 | Karimi-Cherkandi | ........................ H04W 64/003 |
| 2017/0238281 A1* | 8/2017 | Takano | ................. H04W 84/12 370/312 |
| 2018/0160364 A1* | 6/2018 | Wang | .................... H04W 24/10 |
| 2018/0270793 A1* | 9/2018 | Futaki | ............... H04W 72/0446 |
| 2019/0273554 A1* | 9/2019 | Minakuchi | ......... H04N 21/6131 |
| 2020/0383049 A1* | 12/2020 | Tellado | ................. H04W 24/04 |
| 2022/0225127 A1* | 7/2022 | Imran | ................... H04W 24/02 |
| 2022/0303331 A1* | 9/2022 | Svennebring | .... H04N 21/44209 |

* cited by examiner

LOCATION-BASED BASE STATION BANNING FOR MOBILE SYSTEMS

TECHNICAL FIELD

The present disclosure relates generally to computer networks, and, more particularly, to location-based base station banning for mobile systems.

BACKGROUND

Cellular network coverage has made Internet connectivity increasingly ubiquitous. This has led to an ever-increasing demand for bandwidth, to accommodate traffic such as multimedia content and communications (e.g., bandwidth-intensive high definition video streaming or real time video calls, etc.). For instance, passengers of public transportation now expect on-board, high-speed connectivity, which implies a reliable wireless ground-to-vehicle communication.

In general, mobile wireless backhauling is challenging, particularly in cases of fast-moving mobile systems, such as trains, busses, mine carts, trucks, cranes, and the like. These vehicles have to provide connectivity to onboard wired and/or wireless devices without any interruptions. Cellular technologies, such as Long-Term Evolution (LTE), are typically not practical for such scenarios, so backhauling is performed by Wi-Fi between mobile nodes (e.g., on a train) and distributed nodes along the path (e.g., trackside nodes along the rails). However, the dynamic nature of the network, as well as the environmental radio frequency (RF) conditions, may lead to packet losses, reduced throughput, and other such conditions.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a device obtains location data indicative of a location of a mobile system relative to a base station of a wireless network. The device predicts, based on the location data, a drop in received signal strength indicator or throughput that will occur as the mobile system approaches the base station. The device determines, based on the drop predicted by the device, one or more parameters for a ban on the mobile system communicating with the base station. The device prevents the mobile system from communicating with the base station during the ban.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
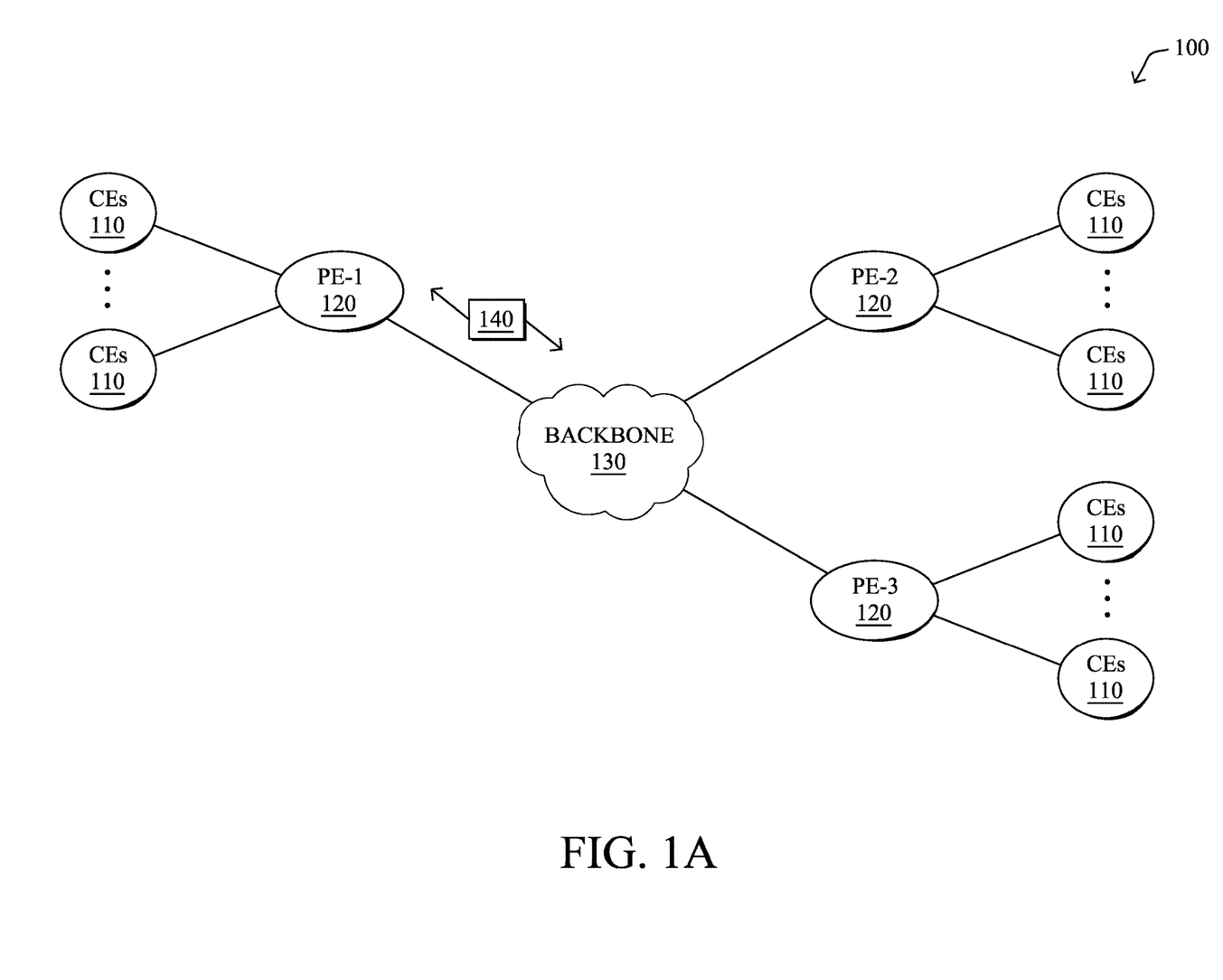
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
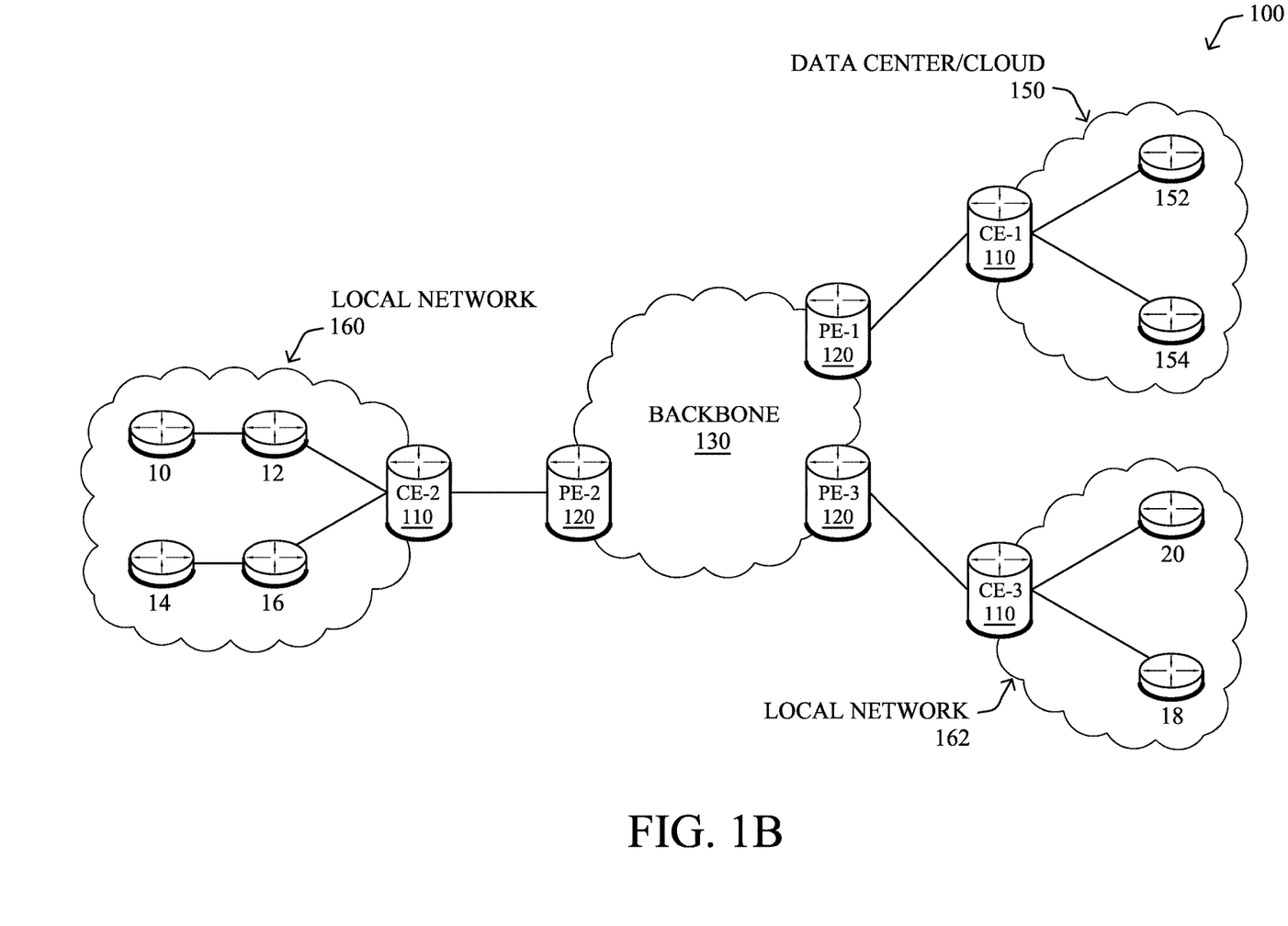

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

According to various embodiments, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
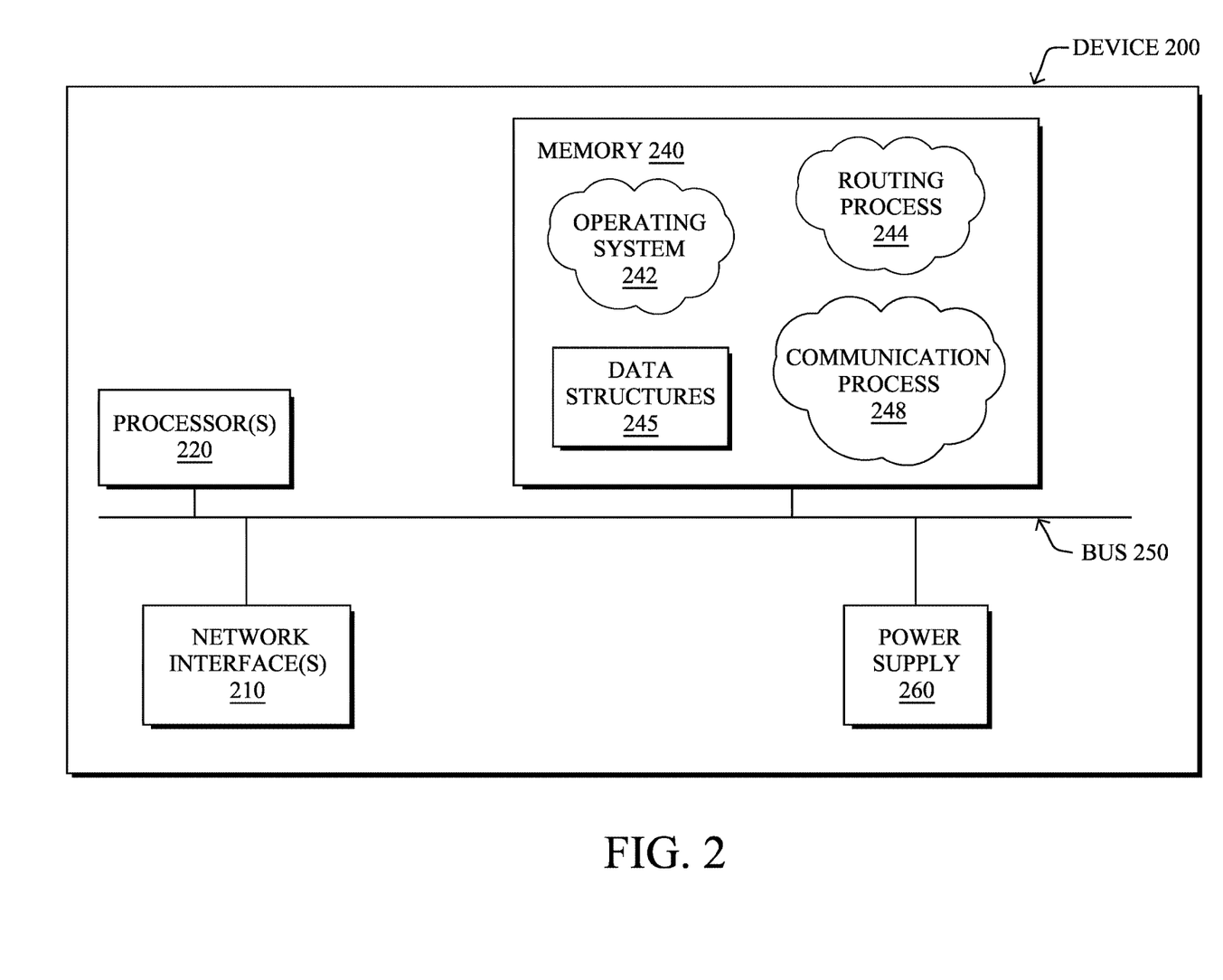
FIG. 2 illustrates an example network device/node.

FIG. 2 is a schematic block diagram of an example node/device 200 that may be used with one or more embodiments described herein. As shown, device 200 may comprise one or more communication interfaces 210 (e.g., wired, wireless, etc.), at least one processor 220, and a memory 240 interconnected by a system bus 250, as well as a power supply 260 (e.g., battery, plug-in, etc.).

Communication interface(s) 210 include the mechanical, electrical, and signaling circuitry for communicating data over a communication link. To this end, communication interface(s) 210 may be configured to transmit and/or receive data using a variety of different communication protocols, such as TCP/IP, UDP, Ethernet, etc. Note that the device 200 may have multiple different types of communication interface(s) 210, e.g., wireless and wired/physical connections, and that the view herein is merely for illustration.

The memory 240 comprises a plurality of storage locations that are addressable by the processor(s) 220 and the communication interface(s) 210 for storing software programs and data structures associated with the embodiments described herein. The processor 220 may comprise necessary elements or logic adapted to execute the software programs and manipulate the data structures 245. An operating system 242, portions of which are typically resident in memory 240 and executed by the processor(s), functionally organizes the node by, inter alia, invoking network operations in support of software processors and/or services executing on the device. These software processors and/or services may comprise a routing process 244 and/or a communication process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process 244 includes instructions executable by processor 220 to perform functions provided by one or more routing protocols, such as proactive or reactive routing protocols as will be understood by those skilled in the art. These functions may, on capable devices, be configured to manage a routing/forwarding table (a data structure 245) including, e.g., data used to make routing/forwarding decisions. In particular, in proactive routing, connectivity is discovered and known prior to computing routes to any destination in the network, e.g., link state routing such as Open Shortest Path First (OSPF), or Intermediate-System-to-Intermediate-System (ISIS), or Optimized Link State Routing (OLSR). Reactive routing, on the other hand, discovers neighbors (i.e., does not have an a priori knowledge of network topology), and in response to a needed route to a destination, sends a route request into the network to determine which neighboring node may be used to reach the desired destination. Example reactive routing protocols may comprise Ad-hoc On-demand Distance Vector (AODV), Dynamic Source Routing (DSR), 6LoWPAN Ad Hoc On-Demand Distance Vector Routing (LOAD), DYnamic MANET On-demand Routing (DYMO), etc. Notably, on devices not capable or configured to store routing entries, routing process 244 may consist solely of providing mechanisms necessary for source routing techniques. That is, for source routing, other devices in the network can tell the less capable devices exactly where to send the packets, and the less capable devices simply forward the packets as directed.

In general, communication process 248 includes instructions executable by processor 220 to perform functions related to a mobile system roaming from one wireless access point to another. To this end, communication process 248 may operate in conjunction with routing process 244, in some instances, to establish and maintain one or more LSPs between a mobile system and the backend infrastructure. An example protocol that uses label-switched paths is the Multiprotocol Label Switching (MPLS) protocol. In general, MPLS operates by appending an MPLS header to a packet that includes a label 'stack.' The label(s) in the stack are inserted by a label edge router (LER) based on the forwarding equivalence class (FEC) of the packet. Paths are also managed via the Label Distribution Protocol (LDP) or Resource Reservation Protocol-Traffic Engineering (RSVP-TE).

In various embodiments, as detailed further below, communication process 248 may also include computer executable instructions that, when executed by processor(s) 220, cause device 200 to perform the techniques described herein with respect to preventing the use of a specific base station of a wireless network. To do so, in some embodiments, communication process 248 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, communication process 248 may employ one or more supervised, unsupervised, or semi-supervised machine learning models. Generally, supervised learning entails the use of a training set of data, as noted above, that is used to train the model to apply labels to the input data. For example, the training data may include sample location data and performance metrics that have been labeled as acceptable or not acceptable. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that communication process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for time series), random forest classification, or the like.

Figure 3:
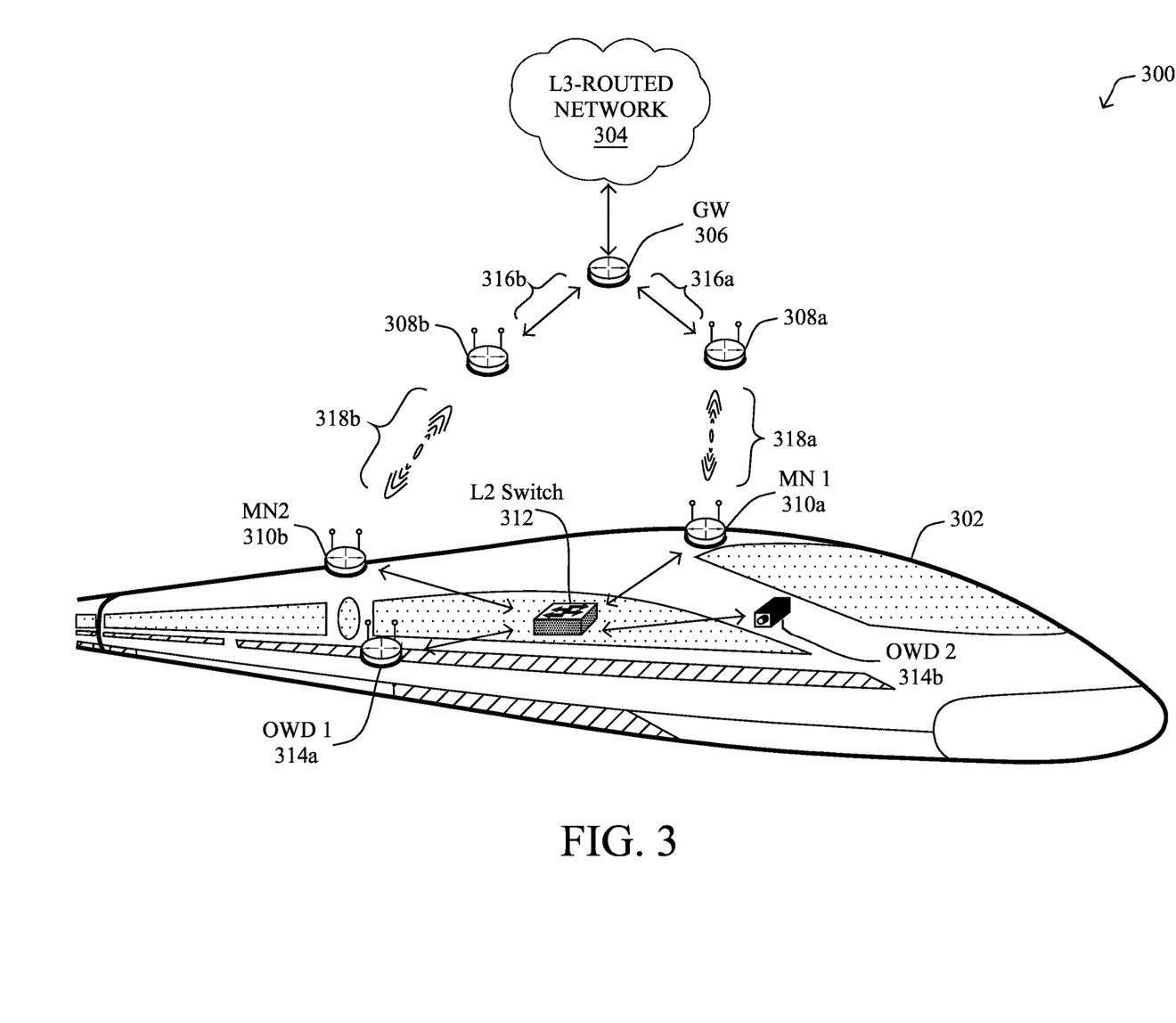
FIG. 3 illustrates an example of a mobile system communicating wirelessly.

FIG. 3 illustrates an example 300 of a mobile system communicating wirelessly, according to various embodiments. As shown, the mobile system 302 may generally take the form of any mobile object or set of objects equipped with its own internal network and configured to communicate wirelessly with a backhauling system during motion. For instance, mobile system 302 may take the form of a train, bus, airplane or other flying vehicle, ferry, automobile, mine cart, crane, truck, another form of vehicle that may be used for transportation or shipping, a vehicle that may be found in a worksite, mining location, industrial site, factory, etc., a robot, or the like. In further cases, mobile system 302 may be a fully-autonomous, or partially-autonomous, vehicle or other system that moves with little or no direct human control.

Onboard mobile system 302 may be various networking devices that support the mobile domain of mobile system 302. In some embodiments, as shown, there may be a Layer-2 (L2) switch 312 onboard mobile system 302 that is connected to any number of onboard devices 314 within the mobile domain of mobile system 302. For instance, onboard device 314a may take the form of an onboard Wi-Fi access point that provides connectivity to any number of user devices (e.g., mobile phones, computers, etc.) of passengers being transported by mobile system 302. Conversely, onboard device 314b may take the form of a security camera that is also connected to L2 switch 312. In various embodiments, some or all of the onboard devices 314 may be onboard wired devices (OWDs), meaning that they communicate with L2 switch 312 via wired connections, such as an Ethernet network or the like.

According to various embodiments, the mobile domain of mobile system 302 may also include a plurality of mobile nodes 310, denoted "MN" in the Figures for simplicity. For instance, as shown, mobile system 302 may include a first MN 310a and a second MN 310b. Each MN 310 may generally include: 1.) a wireless interface to exchange data with wireless access points of the backhaul network and 2.) a local interface to exchange data with the local network of mobile system 302. For instance, MN 310a and MN 310b may each have a wired connection to L2 switch 312.

As would be appreciated, MN 310a and MN 310b may be located on mobile system 302 at a distance from one another, so as to provide spatial diversity to the potential wireless connection points utilized by mobile system 302. For example, MN 310a may be located near the front of mobile system 302 (e.g., the head-end of a train), while MN 310b may be located farther towards the rear of mobile system 302 than that of MN 310a. Thus, even if a particular MN 310 does not have a reliable wireless connection to the backhaul system, another MN 310 of mobile system 302 may (e.g., if the train is going around a curve in the track, etc.). In some instances, MNs 310 may also offer frequency diversity, as well, such as by operating on different frequencies, at least part of the time. As a result, even if one frequency is experiencing interference, the other frequency could be used to form a wireless connection between mobile system 302 and the backhaul system.

Located along the path of travel of mobile system 302 (e.g., a railroad track, a road, a waterway, a runway, etc.) may be any number of wireless access points/base stations 308. For instance, as shown, there may be trackside access points (APs)/base stations 308a-308b shown. Note that while these wireless access points are referred to herein as 'trackside,' their locations can be varied depending on the deployment scenario (e.g., roadside, etc.).

During operation, base stations 308a-308b may form wireless connections with MN 310a and/or MN 310b, to provide wireless connectivity to mobile system 302 as it travels. To this end, each base station 308 may include at least 1.) a wireless interface to communicate with a MN 310 and 2.) an interface to communicate with a gateway, denoted "GW" 306 in the Figures for simplicity. Typically, the connections between base stations 308a-308b and GW 306 are wired connections that use a suitable wired communication protocol, such as Ethernet.

GW 306 represents the other end of the backhauling system and provides Layer-3 (L3) routing functions. To do so, GW 306 may include at least one interface connected to L3-routed network 304, as well as any number of interfaces to communicate with base stations 308. For instance, L3-routed network 304 may take the form of the Internet, in many instances, although the techniques herein may be extended to any number of different types of external networks, as desired.

Traditionally, a backhaul system supporting mobile domains/systems relies on the use of multiple tunnels, to convey traffic between the L3 gateway and the mobile domain/system. For instance, as shown, assume that MN 310a has formed a wireless connection 318a with base station 308a. Such a connection may be formed using a suitable transmission protocol, such as the Prodigy protocol by Fluidmesh (now Cisco Systems) or another wireless protocol that supports extremely fast handoffs. Consequently, MN 310a may establish a first tunnel over wireless connection 318a. GW 306 and base station 308a may form a second tunnel via their connection 316a, likewise. Thus, when base station 308a sends traffic that it receives from MN 310a towards GW 306, it may encapsulate the traffic and tunneled via the first tunnel, which base station 308a then encapsulates for transport via the second tunnel to GW 306. A similar approach may be taken with respect to wireless connection 318b between MN 310b and base station 308b, as well as connection 316b between base station 308b and GW 306.

In alternative embodiments, a single L2 tunnel may be established between each base station 308 and GW 306. This tunnel will carry L2 traffic between GW 306 and the MN 310 to which the base station 308 is connected. For instance, a first L2 tunnel may be formed between GW 306 and base station 308a over which traffic conveyed between base station 308a and MN 310a may be transported, assuming that wireless connection 318a exists. Similarly, another GW 306 and base station 308b may form a second L2 tunnel over which traffic conveyed between base station 308b and MN 310b may be transported, assuming that wireless connection 318a exists.

Typically, only a single wireless link is active at any given time between a mobile system, such as mobile system 302, and any given base station 308. For instance, assume that MN 310a is wirelessly connected to base station 308a. In such a case, any other MN 310 on mobile system 302 (e.g., MN 310b, etc.) may be in an idle state at that time. In other words, one of the mobile nodes (e.g., MN 310a) may be designated as the primary, while the other is designated as the secondary (e.g., MN 310b) and remains idle. As mobile system 302 roams, the primary node may begin passing its traffic to the secondary node, to begin leveraging its own connection to the fixed infrastructure. In turn, the roles of the two nodes may be switched, thereby making MN 310a the secondary node and MN 310b the primary node.

As noted above, the dynamic nature of many mobile wireless networks can lead to radio frequency (RR) conditions that can impede on the communication traffic between the mobile system and the base station. For instance, a 'key-hole' phenomenon has been observed in real-world implementations in subways that make use of a 2×2 Multiple input, multiple-output orthogonal frequency-division multiplexing (MIMO-OFDM) setup. Under this phenomenon, as the mobile system approaches a base station, performance actually decreases. More specifically, when the mobile system reaches a certain 'key-hole entry point' at a certain distance to the base station, the received signal strength indicator (RSSI) and throughput have been observed to actually decrease, until the node exits a key-hole exit point after passing the base station.

Figure 4A:
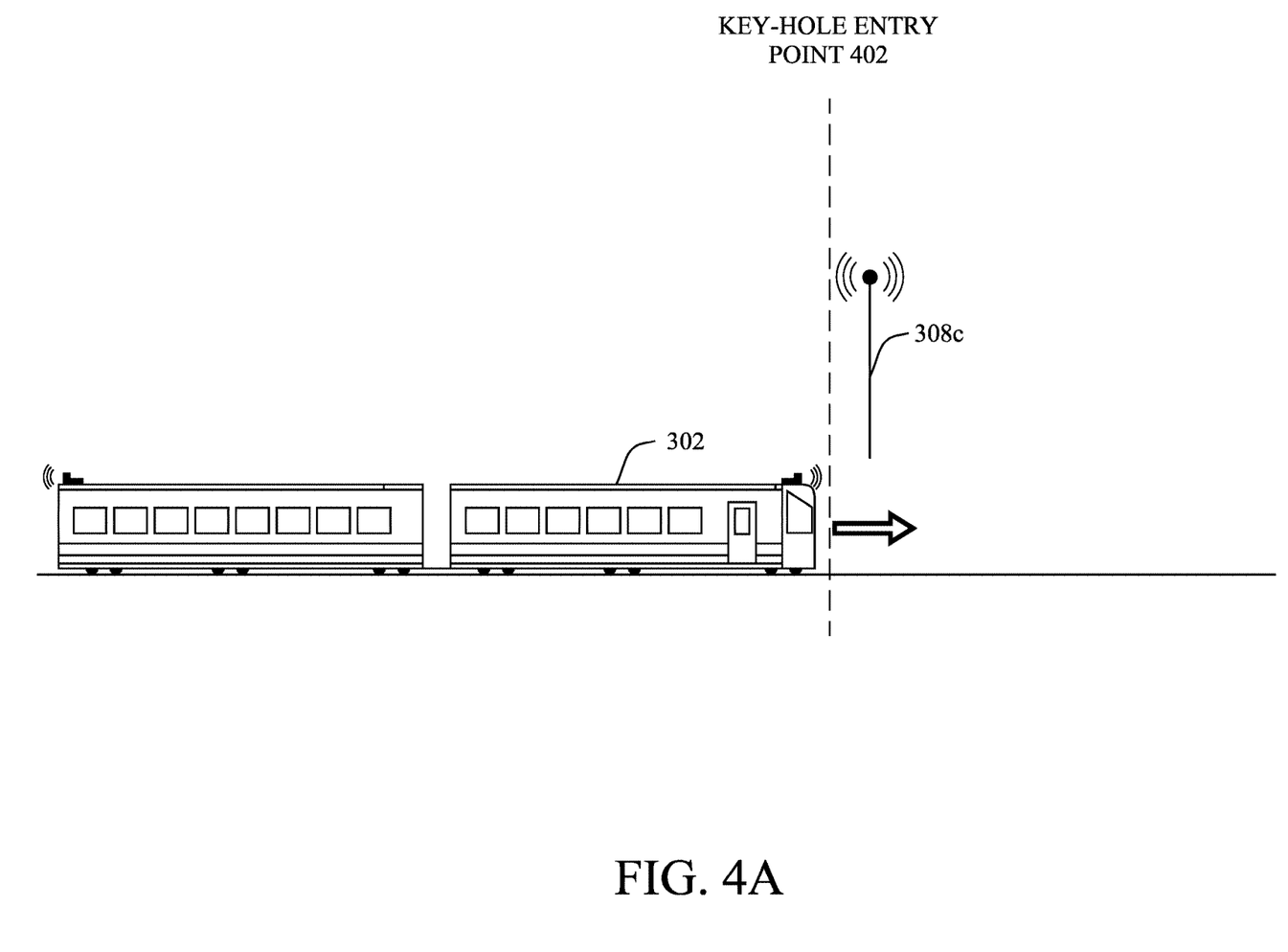
FIGS. 4A-4B illustrate examples of a mobile system entering and exiting a signal key-hole.
Figure 4B:
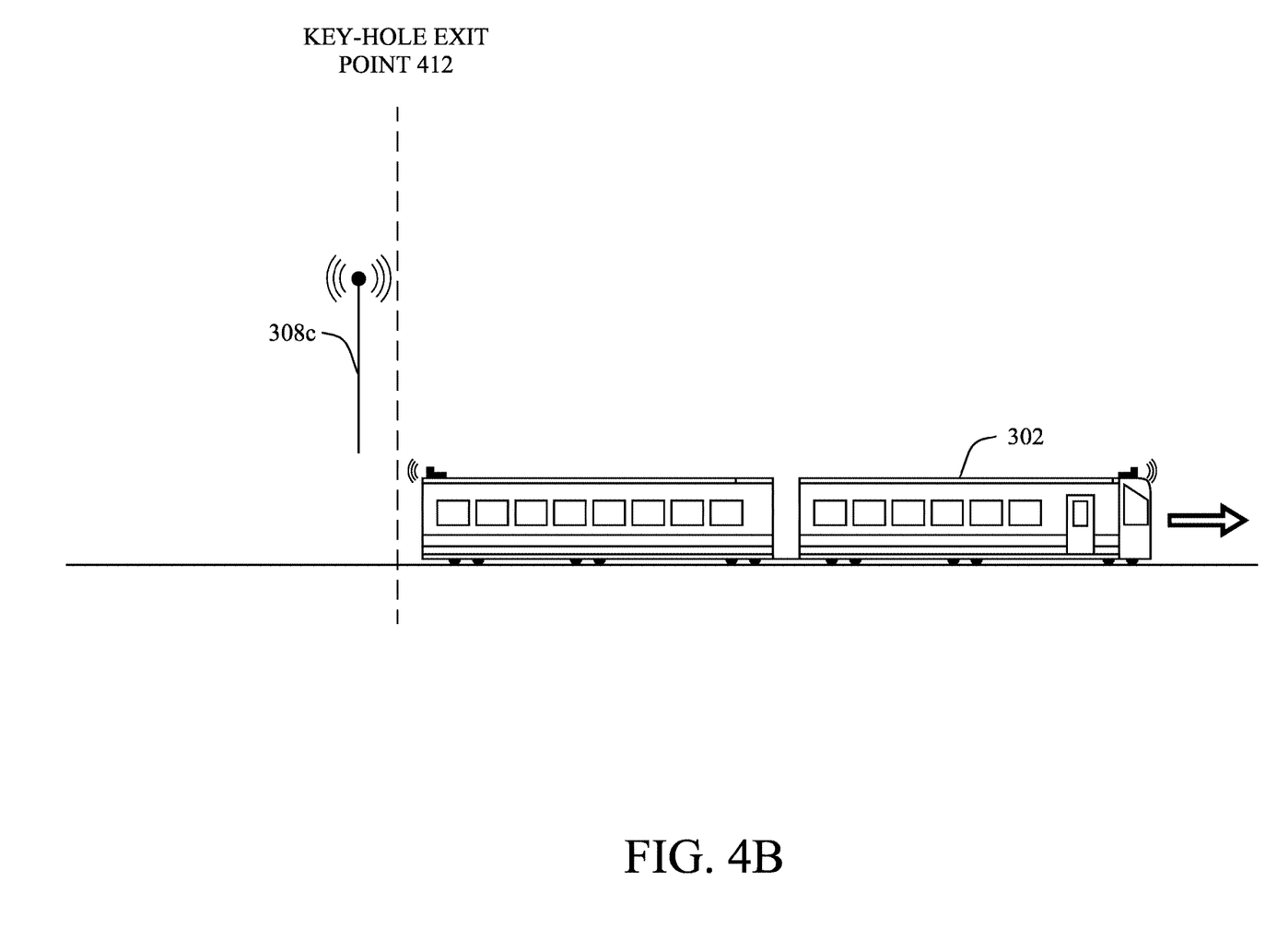

FIGS. 4A-4B illustrate an example of mobile system 302 entering and exiting such signal key-hole, according to various embodiments. As shown in FIG. 4A, assume that mobile system 302 is traveling along a railway track in a direction towards a base station 308c. Typically, the RSSI and, consequently, the throughput of the communications between mobile system 302 and base station 308c is expected to increase over time, as mobile system 302 nears base station 308c. However, it has been observed that certain mobile networks experience what is referred to herein as a signal key-hole whereby the RSSI and throughput between mobile system 302 and base station 308c actually decrease, considerably, once mobile system 302 has passed a key-hole entry point 402. This reduced performance will then continue until mobile system 302 passes a key-hole exit point 412 on the other side of base station 308c.

Figure 5:
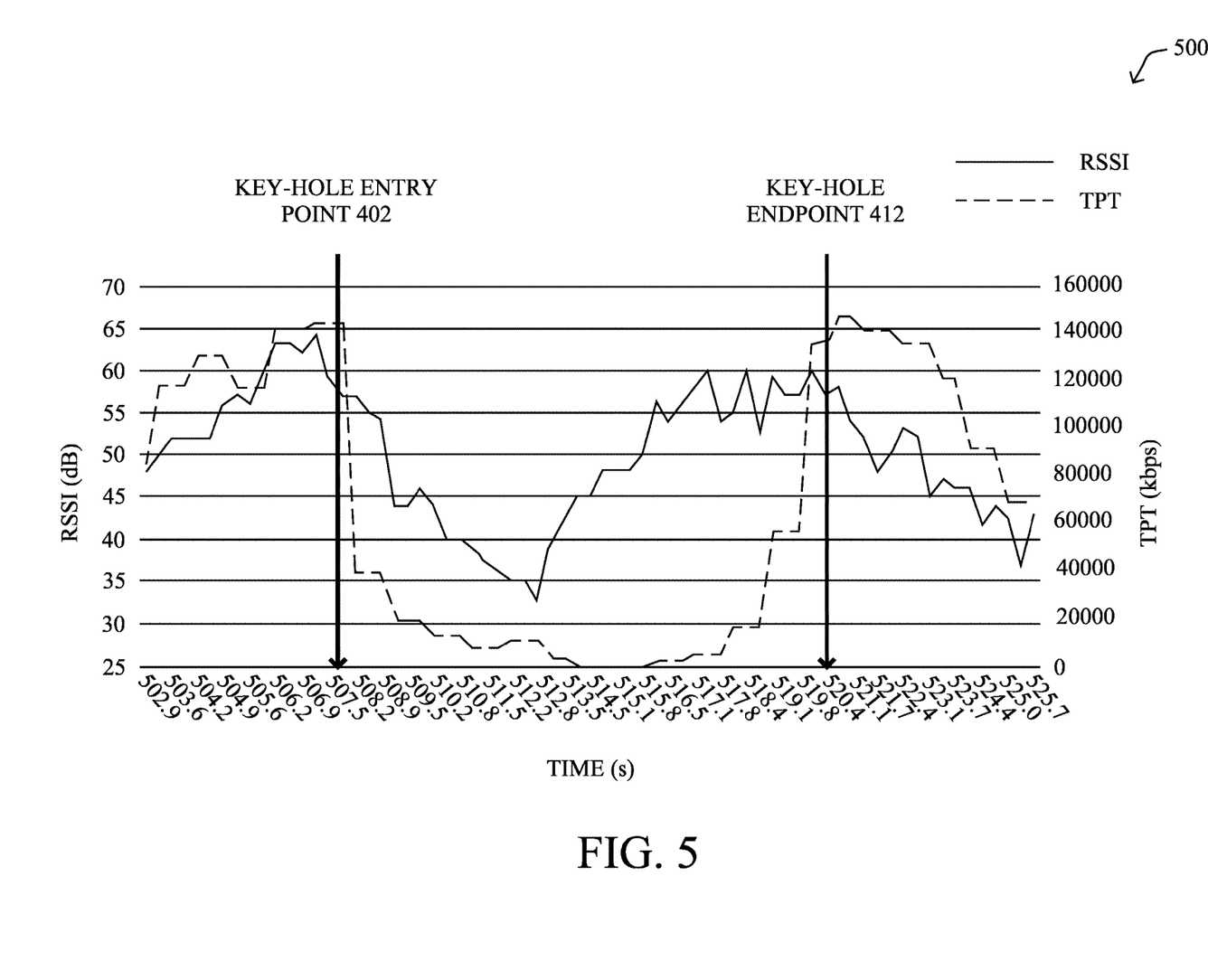
FIG. 5 illustrates an example plot of the effects of a signal key-hole on received signal strength indicator (RSSI) and throughput.

FIG. 5 illustrates an example plot 500 of the effects of a signal key-hole on the RSSI and throughput between mobile system 302 and base station 308c, according to various embodiments. The y-axis of plot 500 is the RSSI and throughput of the communications between mobile system 302 and base station 308 over the course of time, as mobile system 302 passes the key-hole entry point 402. Once this occurs, the RSSI drops off considerably, as well as the throughput. This phenomenon continues on until mobile system 302 passes base station 308c and crosses key-hole exit point 412.

While it may be possible to set a static RSSI threshold to initiate measures to avoid or mitigate the effects of the key-hole phenomenon, various factors can affect where key-hole entry point 402 and key-hole exit point 412 exist with respect to any given base station. Indeed, the environmental factors, specific equipment in use, and other factors, can affect when mobile system 302 will experience the key-hole phenomenon.

Location-Based Base Station Banning for Mobile Systems

The techniques herein introduce an adaptive mechanism able to learn when a key-hole phenomenon will affect the communications of a mobile system in a wireless network, based in part on location data for the mobile system. In turn, the predictions can be used to ban/prohibit the mobile system from communicating with the offending base station for at least a period of time, as the mobile system passes the base station.

Illustratively, the techniques described herein may be performed by hardware, software, and/or firmware, such as in accordance with the communication process 248, which may include computer executable instructions executed by the processor 220 (or independent processor of interfaces 210) to perform functions relating to the techniques described herein, potentially in conjunction with routing process 244.

Specifically, according to various embodiments, a device obtains location data indicative of a location of a mobile system relative to a base station of a wireless network. The device predicts, based on the location data, a drop in received signal strength indicator or throughput that will occur as the mobile system approaches the base station. The device determines, based on the drop predicted by the device, one or more parameters for a ban on the mobile system communicating with the base station. The device prevents the mobile system from communicating with the base station during the ban.

Operationally, the techniques herein leverage the fact that many wireless network deployments are designed such that their base stations have overlapping coverage at any given location. Thus, even within a signal key-hole, a mobile system may be within range of one or more other base stations, in addition to the offending base station. According to various embodiments, the techniques herein propose employing a 'ban' on the mobile system utilizing the offending base station while located within the key-hole, in favor of using one or more other base stations that are within communication range of the mobile system.

Figure 6:
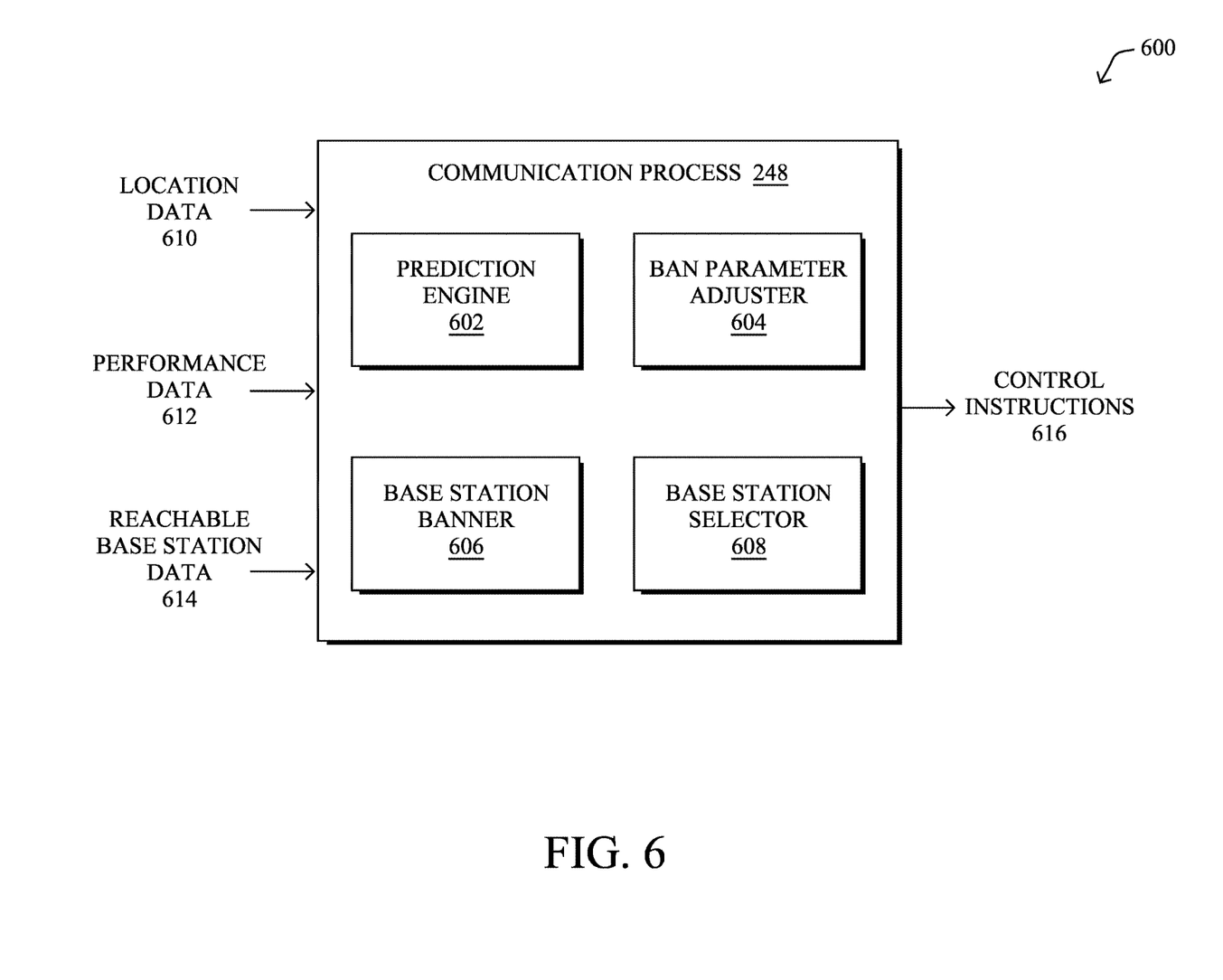
FIG. 6 illustrates an example architecture for location-based base station banning.

FIG. 6 illustrates an example architecture 600 for location-based base station banning, according to various embodiments. At the core of architecture 600 is predictive modeling process 248, which may be executed by a device located directly on a mobile system or another device in communication therewith (e.g., a server, gateway, base station, etc.). As shown, communication process 248 may include any or all of the following components: a prediction engine 602, a ban parameter adjuster 604, a base station banner 606, and/or a base station selector 608. As would be appreciated, the functionalities of these components may be combined or omitted, as desired. In addition, these components may be implemented on a singular device or in a distributed manner, in which case the combination of executing devices can be viewed as their own singular device for purposes of executing communication process 248.

During execution, communication process 248 may obtain location data 610 indicative of the locations of a mobile system as it moves throughout an area in which a wireless base station is located. Thus, location data 610 may indicate to communication process 248 the locations of the mobile system over time, relative to that of the base station. For instance, in the simple case of a straight railway, location data 610 may indicate that the mobile system (e.g., a train) is located approximately two hundred meters away from the base station.

In various embodiments, location data 610 may include any or all of the following forms of location data:
- Global Positioning System (GPS) information—for instance, this may include the specific coordinates of the mobile system over time.
- Wi-Fi positioning system (WPS) location data newer Wi-Fi standards, such as Wi-Fi 6 and Wi-Fi 7 now include location determining mechanisms, such as based on signal strength/RSSI, fingerprint-based, based on the angle of arrival (AoA) of the wireless signals, based on the time of flight (ToF), etc.
- Using the specific Wi-Fi Round Trip Time (RTT) mechanism found in the IEEE 802.11mc protocol.
- Etc.

In addition to obtaining location data 610, communication process 248 may also obtain performance data 612 indicative of the performance metric(s) for the communications between the mobile system and the base station associated with the key-hole phenomenon. For instance, in various embodiments, performance data 612 may indicate the RSSI measurements, throughput measurements, packet loss, jitter, delay, or the like, for the communications.

According to various embodiments, location data 610 and performance data 612 may be correlated with one another in some way. In some embodiments, the two may be directly correlated. For instance, an RSSI measurement may be associated with a location coordinate at which the mobile system was located when the measurement was taken. In one embodiment, both location data 610 and performance data 612 may include timestamp information, thereby allowing the two to be associated with one another. For instance, an RSSI measurement may be associated with a particular location of the mobile system, if the two share the same or similar timestamps (e.g., within a defined threshold).

In general, prediction engine 602 may use location data 610 and performance data 612 to model the relationships between the locations of the mobile system relative to the base station and the performance of the communications between them. For instance, in some embodiments, prediction engine 602 may take the form a machine learning-based prediction model that has been trained, using a history of location data 610 and performance data 612, to predict the performance metrics that the mobile system is likely to experience at a given location. As would be appreciated, such a model may be trained using historical data captured directly by the base station, mobile system, and/or other mobile systems that have communicated with the base station. In further embodiments, the training data used to train the model of prediction engine 602 may include synthetic training data that was not actually observed in the network deployment, but is expected to represent its characteristics. In addition, the training of the model of prediction engine 602 may be repeated any number of times, either on demand, periodically, or when the performance of the model is below an acceptable level.

According to various embodiments, the predictive model of prediction engine 602 is able to predict when and/or where the mobile system will enter a signal key-hole for its current base station, based on the location(s) of the mobile system indicated by location data 610. In other words, prediction engine 602 may be configured to predict when and/or where the mobile system will enter the key-hole entry point for the base station, as the mobile system approaches the base station. For instance, if timestamp information is available, prediction engine 602 may take into account the current location, rate of travel/velocity, and/or acceleration of the mobile system, to predict that it will enter the key-hole entry point within a certain amount of time. In other instances, prediction engine 602 may simply predict a particular location associated with the key-hole entry point for the base station. In further embodiments, prediction engine 602 may also be configured to predict when and/or where the mobile system is likely to reach the key-hole exit point for the base station, based on the location(s) of the mobile system that are indicated by location data 610.

The identification of the key-hole entry and/or exit points by the prediction model(s) of prediction engine 602 may be explicit (e.g., the model directly predicts that the mobile system will enter the key-hole entry point at coordinates Z) or in a dynamic manner using one or more defined threshold(s). For instance, the prediction model may simply be trained to predict RSSI or throughput levels and prediction engine 602 may identify a key-hole entry or exit point when those levels cross a defined threshold. In some embodiments, such a threshold may also be user-configurable. In either case, prediction engine 602 may determine when and/or where the mobile system is going to enter or exit the key-hole of the base station.

According to various embodiments, communication process 248 may also include ban parameter adjuster 604 that is configured to determine the parameters of any ban on the use of the base station by the mobile system. For instance, if prediction engine 602 determines that the mobile system is going to enter the key-hole of its base station at location Y or at time T, ban parameter adjuster 604 may set the starting time or location of the ban to coincide or even precede Y or T by a certain amount (e.g., to initiate a ban on the use of the base station right before the mobile system reaches the key-hole entry point). Such a margin that deviates from the predicted key-hole entry point may be user-configurable, in some embodiments.

During a ban, the mobile system will be prevented from communicating with the base station that it is approaching, so as to not use that base station for communications while located in the key-hole region of that base station. In turn, base station banner 606 may use the parameter(s) set by ban parameter adjuster 604 to generate control instructions 616 that cause the base station to stop using that base station, accordingly.

As shown, communication process 248 may also receive reachable base station data 614 that indicates any other base stations that may be reachable by the mobile system while the mobile system is located in the key-hole region of the base station that it is approaching. In addition, reachable base station data 614 may also include performance metrics for those base stations, such as their RSSIs, etc. Using reachable base station data 614, base station selector 608 may select the next 'best' base station to be used by the mobile system, while the ban is active, and include this information in control instructions 616. Alternatively, such as when communication process 248 is executed by a device that is external to the mobile system, base station selector 608 may be located directly on the mobile system and control instructions 616 may leave it up to the mobile system to select another base station to use.

In various embodiments, a ban on the use of the base station that the mobile system is approaching may also be temporary in nature and end after the mobile system has passed the base station and reached the key-hole exit point. In such cases, ban parameter adjuster 604 may similarly determine end parameters for the ban implemented by base station banner 606 via control instructions 616. For instance, control instructions 616 may indicate an amount of time or location at which the ban on the base station is to end. In one embodiment, control instructions 616 may also include an instruction that causes the mobile system to revert back to communicating with the base station, once the ban on that base station has ended. In another embodiment, control instructions 616 may simply allow the mobile system to select its 'best' base station, once the ban has ended, although this is typically the base station from which it was previously banned from using.

By way of example and referring again to FIGS. 4A-4B, again consider the case in which mobile system 302 is approaching base station 308c. In such a case, communication process 248 located either onboard mobile system 302 or externally, may predict that mobile system 302 is about to reach key-hole entry point 402. In such a case, communication process 248 may cause mobile system 302 to be banned from using base station 308c, once it has reached key-hole entry point 402. Such a ban may cause mobile system 302 to connect with another base station 308, albeit farther away than base station 308c, as that base station may still offer better performance than base station 308c while mobile system 302 is in its signal key-hole region.

As shown in FIG. 4B, once mobile system 302 has passed base station 308c and has reached key-hole exit point 412, communication process 248 may end the ban/prohibition on mobile system 302 using base station 308c. As a result, mobile system 302 may switch back from the other base station 308 to again using base station 308c.

Figure 7:
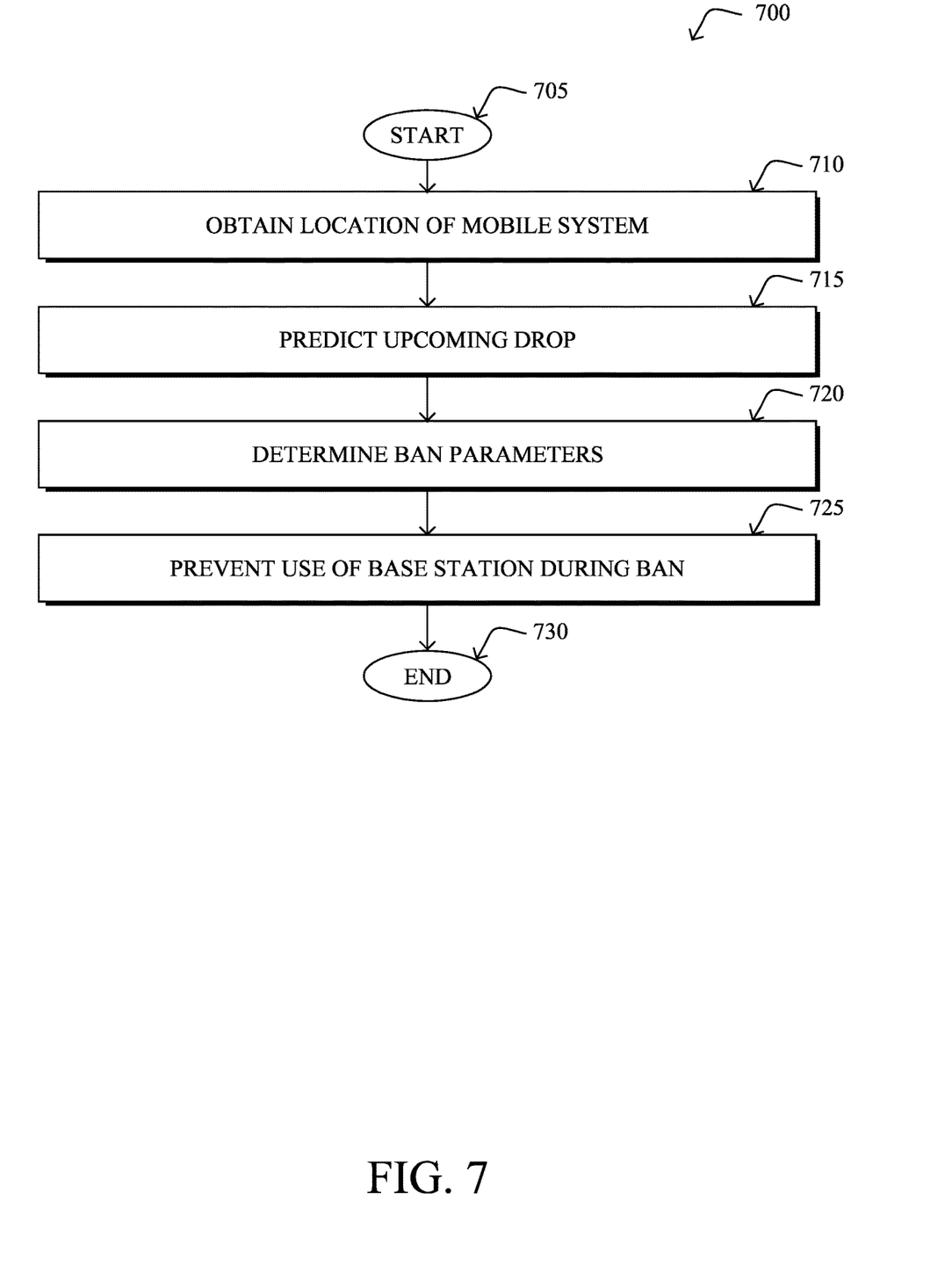
FIG. 7 illustrates an example simplified procedure for enacting a ban on the use of a particular base station.

FIG. 7 illustrates an example simplified procedure for enacting a ban on the use of a particular base station, in accordance with one or more embodiments described herein. For example, a non-generic, specifically configured device/apparatus (e.g., device 200), located on board a mobile system of a wireless network, or external to it, may perform procedure 700 by executing stored instructions (e.g., communication process 248). Procedure 700 may start at step 705 and continues on to step 710 where, as described in greater detail above, the device may obtain location data indicative of one or more locations of the mobile system relative to a base station in the wireless network. For instance, the location data may comprise GPS coordinates for the mobile system, a round trip time of communications between the mobile system and the base station, an angle of arrival of those communications, fingerprinting of those communications, combinations thereof, or the like.

At step 715, as detailed above, the device may predict, based on the location data, a drop in RSSI or throughput that will occur as the mobile system approaches the base station. In some embodiments, the device may do so by using the location data as input to a machine learning model that has been trained to predict received signal strength indicator values between the mobile system and the base station based on the location of the mobile system.

At step 720, the device may determine, based on the drop predicted by the device, one or more parameters for a ban on the mobile system communicating with the base station, as described in greater detail above. In some embodiments, the one or more parameters may be indicative of a start time or end time for the ban. In further embodiments, the one or more parameters may be indicative of a start location or end location for the ban.

At step 725, as detailed above, the device may prevent the mobile system from communicating with the base station during the ban. In some embodiments, the mobile system may communicate with a different base station of the wireless network during the ban. In further embodiments, the device may do so by sending an instruction to the mobile system that causes the mobile system to stop communicating with the base station during the ban. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, are able to predict when a mobile system of a wireless network is going to enter into a key-hole region of a base station that it is approaching and proactively prevent the mobile system from using that base station while it passes through the key-hole region. In doing so, the mobile system may instead communicate with another base station of the wireless network that also has coverage over the key-hole region of the base station that the mobile system is approaching.

While there have been shown and described illustrative embodiments that provide for location-based base station banning for mobile nodes/systems, it is to be understood that various other adaptations and modifications may be made within the spirit and scope of the embodiments herein. For example, while certain embodiments are described herein with respect to using certain wired and/or wireless protocols, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

The invention claimed is:

1. A method comprising:
obtaining, by a device, location data indicative of a location of a mobile system relative to a base station of a wireless network;
predicting, by the device and based on the location data, a drop in received signal strength indicator or throughput that will occur as the mobile system approaches the base station, including when the drop in the received signal strength indicator or the throughput is to be below a defined threshold;
determining, by the device and based on the drop predicted by the device, one or more parameters for a ban on the mobile system communicating with the base station, wherein the one or more parameters are indicative of a start parameter for the ban; and
preventing, by the device, the mobile system from communicating with the base station during the ban.

2. The method as in claim 1, wherein the one or more parameters are indicative of a start time or end time for the ban.

3. The method as in claim 1, wherein the one or more parameters are indicative of a start location or end location for the ban.

4. The method as in claim 1, wherein the mobile system communicates with a different base station during the ban.

5. The method as in claim 1, wherein the ban is enforced for a period of time during which the mobile system approaches the base station.

6. The method as in claim 5, wherein the ban is also enforced for a period of time after the mobile system passes the base station.

7. The method as in claim 1, wherein the location data comprises Global Positioning System (GPS) coordinates.

8. The method as in claim 1, wherein the location data is generated based on at least one of: a round trip time of communications between the mobile system and the base station, an angle of arrival of those communications, or fingerprinting of those communications.

9. The method as in claim 1, wherein the device is external to the mobile system and wherein preventing the mobile system from communicating with the base station during the ban comprises:
sending an instruction to the mobile system that causes the mobile system to stop communicating with the base station during the ban.

10. The method as in claim 1, wherein predicting, based on the location data, the drop in received signal strength indicator or throughput that will occur as the mobile system approaches the base station comprises:
using the location data as input to a machine learning model that has been trained to predict received signal strength indicator or throughput values between the mobile system and the base station based on the location of the mobile system.

11. An apparatus, comprising:
one or more network interfaces;
a processor coupled to the one or more network interfaces and configured to execute one or more processes; and
a memory configured to store a process that is executable by the processor, the process when executed configured to:

obtain location data indicative of a location of a mobile system relative to a base station of a wireless network;

predict, based on the location data, a drop in received signal strength indicator or throughput that will occur as the mobile system approaches the base station, including when the drop in the received signal strength indicator or the throughput is to be below a defined threshold;

determine, based on the drop predicted by the apparatus, one or more parameters for a ban on the mobile system communicating with the base station, wherein the one or more parameters are indicative of a start parameter for the ban; and prevent the mobile system from communicating with the base station during the ban.

12. The apparatus as in claim 11, wherein the one or more parameters are indicative of a start time for the ban, an end time for the ban, a start location for the ban, or an end location for the ban.

13. The apparatus as in claim 11, wherein the mobile system communicates with a different base station during the ban.

14. The apparatus as in claim 11, wherein the ban is enforced for a period of time during which the mobile system approaches the base station.

15. The apparatus as in claim 14, wherein the ban is also enforced for a period of time after the mobile system passes the base station.

16. The apparatus as in claim 11, wherein the location data comprises Global Positioning System (GPS) coordinates.

17. The apparatus as in claim 11, wherein the location data is generated based on at least one of: a round trip time of communications between the mobile system and the base station, an angle of arrival of those communications, or fingerprinting of those communications.

18. The apparatus as in claim 11, wherein the apparatus is external to the mobile system and wherein the apparatus prevents the mobile system from communicating with the base station during the ban by:

sending an instruction to the mobile system that causes the mobile system to stop communicating with the base station during the ban.

19. The apparatus as in claim 11, wherein the apparatus predicts, based on the location data, the drop in received signal strength indicator or throughput that will occur as the mobile system approaches the base station by:

using the location data as input to a machine learning model that has been trained to predict received signal strength indicator values or throughput between the mobile system and the base station based on the location of the mobile system.

20. A tangible, non-transitory, computer-readable medium storing program instructions that cause a device to execute a process comprising:

obtaining, by the device, location data indicative of a location of a mobile system relative to a base station of a wireless network;

predicting, by the device and based on the location data, a drop in received signal strength indicator or throughput that will occur as the mobile system approaches the base station, including when the drop in the received signal strength indicator or the throughput is to be below a defined threshold;

determining, by the device and based on the drop predicted by the device, one or more parameters for a ban on the mobile system communicating with the base station wherein the one or more parameters are indicative of a start parameter for the ban; and preventing, by the device, the mobile system from communicating with the base station during the ban.

* * * * *

UNITED STATES PATENT AND TRADEMARK OFFICE
CERTIFICATE OF CORRECTION

| | | |
|---|---|---|
| PATENT NO. | : 12,052,648 B2 | Page 1 of 1 |
| APPLICATION NO. | : 17/220220 | |
| DATED | : July 30, 2024 | |
| INVENTOR(S) | : Gaetano Catalli et al. | |

It is certified that error appears in the above-identified patent and that said Letters Patent is hereby corrected as shown below:

In the Specification

Column 8, Line 43 please amend as shown:
wireless networks can lead to radio frequency (RF) condi- Signed and Sealed this
First Day of October, 2024

Katherine Kelly Vidal
*Director of the United States Patent and Trademark Office*